United States Patent [19]
Krebs et al.

[11] Patent Number: 5,330,228
[45] Date of Patent: Jul. 19, 1994

[54] SAFETY RESTRAINT FOR MOTOR VEHICLES

[75] Inventors: Bernd Krebs, Wettstetten, Fed. Rep. of Germany; Jacques M. Dulin, Morgan Hill, Calif.

[73] Assignee: Audi AG, Ingolstadt, Fed. Rep. of Germany

[21] Appl. No.: 861,888

[22] PCT Filed: Feb. 2, 1991

[86] PCT No.: PCT/EP91/00195
§ 371 Date: May 27, 1992
§ 102(e) Date: May 27, 1992

[87] PCT Pub. No.: WO91/15383
PCT Pub. Date: Oct. 17, 1991

[30] Foreign Application Priority Data
Mar. 31, 1990 [DE] Fed. Rep. of Germany ....... 4010452

[51] Int. Cl.$^5$ ............ B60R 21/02; B60R 22/26; B60R 22/18; B60N 2/48
[52] U.S. Cl. ................. 280/801.2; 297/483; 280/808
[58] Field of Search .......... 280/808 R, 801 A, 751; 297/483, 410

[56] References Cited

U.S. PATENT DOCUMENTS

| | | | |
|---|---|---|---|
| 2,985,229 | 5/1961 | Shambin | 297/410 |
| 3,471,197 | 10/1969 | Ely | 297/385 |
| 3,542,428 | 11/1970 | Colucci | 297/410 |
| 3,907,329 | 9/1975 | Erion et al. | 280/808 |
| 3,929,351 | 12/1975 | Fricko | 297/483 |
| 3,981,519 | 9/1976 | Cataldo | 297/483 |
| 4,285,545 | 8/1981 | Protze | 297/483 |
| 4,348,037 | 9/1982 | Law et al. | 280/733 |
| 4,518,174 | 5/1985 | Sedlmayr | 280/801 A |
| 4,645,233 | 2/1987 | Bruse et al. | 280/808 |
| 4,725,076 | 2/1988 | Taylor | 280/808 |
| 4,730,875 | 3/1988 | Yoshitsugu | 297/483 |

FOREIGN PATENT DOCUMENTS

| | | |
|---|---|---|
| 2810577 | 9/1979 | Fed. Rep. of Germany . |
| 3021126 | 12/1981 | Fed. Rep. of Germany . |
| 8431428 | 2/1985 | Fed. Rep. of Germany . |
| 3427466 | 3/1985 | Fed. Rep. of Germany . |
| 8608908 | 9/1987 | Fed. Rep. of Germany . |
| 3807928 | 9/1989 | Fed. Rep. of Germany . |
| 55-34860 | 3/1980 | Japan . |

*Primary Examiner*—Karin L. Tyson
*Attorney, Agent, or Firm*—Jacques M. Dulin

[57] ABSTRACT

A safety belt restraint arrangement for a motor vehicle which automatically adjusts the height of the head rest to an optimal position during a collision. In a principle embodiment a seat belt guide or follower member is formed into the side of the head rest for directing the seat belt, from an upwardly and rearwardly disposed seat belt deflecting member associated with the motor vehicle interior, to pass obliquely downward across the front portion of vehicle seat for connection with the seat belt buckle assembly in a conventional way. The follower member includes a pressure or stopping face for the seat belt so that, upon collision, the tightening of the seat belt acts against the pressure face of the follower to automatically raise the head rest to a preselected desired optimal position. The pre-selected optimal height adjustment is accomplished by positioning the follower member with respect to the head rest. During an impact the head rest moves upwardly until a straight line is formed in the belt under tension between the upper deflection point and the point of contact between the passenger and the shoulder belt. In a preferred embodiment the head rest guide or follower member is formed as an eye to fully surround the seat belt to effectively couple the seat belt with the head rest at all times. In an alternative embodiment, the eye is adjustable with respect to the head rest. In another embodiment, the inner faces of the eye include pressure switches which, upon closing by pressure of the belt, signal a motor to raise or lower the head rest until pressure is release.

4 Claims, 1 Drawing Sheet

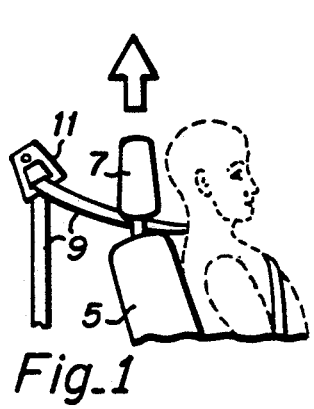
Fig_1
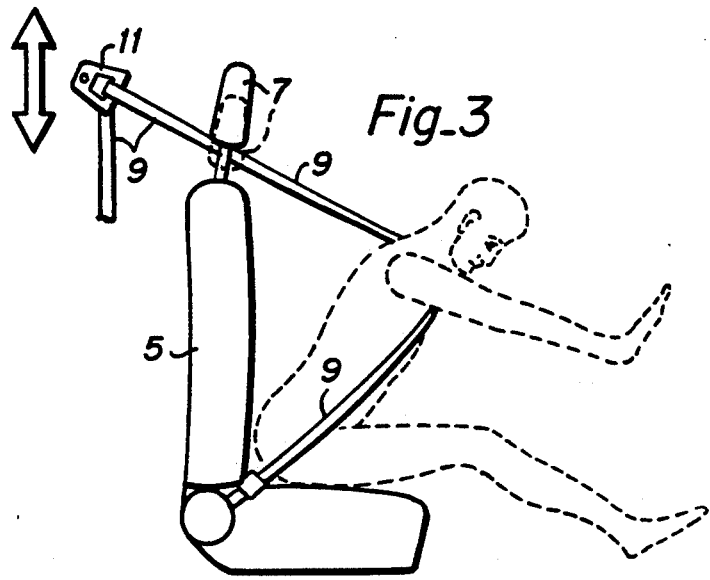
Fig_3
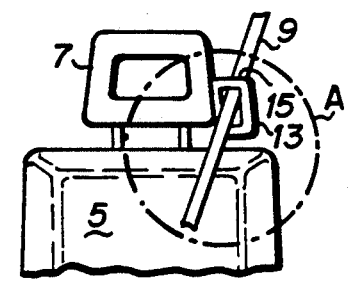
Fig_2
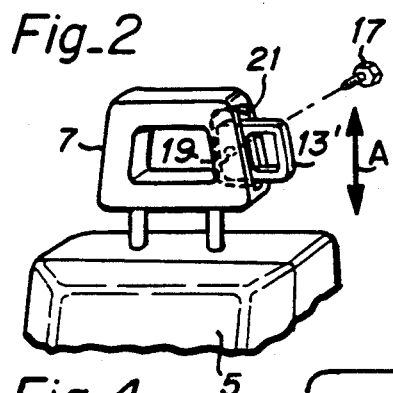
Fig_4
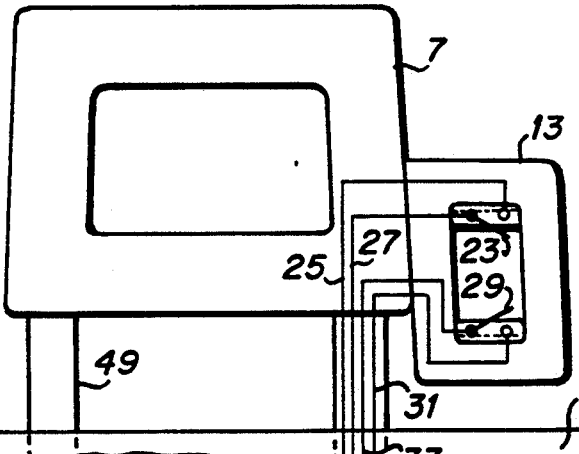
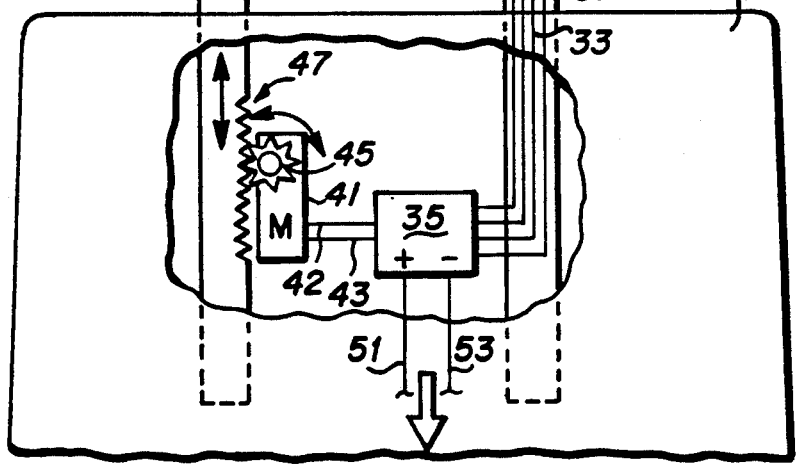
Fig_5
TO ELECTRICAL SYSTEM

SAFETY RESTRAINT FOR MOTOR VEHICLES

FIELD

The invention relates generally to a safety restraint device for motor vehicles and more particularly, provides a height adjustable head rest which is automatically moved to a proper neck and head supporting level in response to seat belt tightening during a collision.

BACKGROUND

It is well known in motor vehicles to provide a car seat design having a height adjustable head rest and wherein the head rest is coordinated with a safety belt arrangement. The safety belt typically includes a lap and shoulder belt, whereby the shoulder belt is guided obliquely downward from an upper deflection or linkage point associated with the motor vehicle interior wall, to the head rest and then diagonally across the front side of the seat back to terminally connect with a buckle assembly. In such an arrangement, the head rest can be moved to a desired height position by hand or by a provided electric motor.

It is also known from the prior art that most users of these types of motor vehicle seats do not correctly adjust the height of the head rest, and thus, in the event of collision are subjected to an increased risk of "whiplash-type" injuries to the head and neck. German Patent Document DE 28 10 577 (corresponding to U.S. Pat. No. 4,285,545) discloses an automobile passenger seat having an automatically positionable head rest. Height adjustment for the head rest is dependent upon the fore-aft position of the seat with respect to a fixed point of reference associated with the seat's mounting points. Complex hydraulic and/or mechanical actuating means are used for the automatic height positioning of the head rest and operate on the assumption that larger persons require a higher arrangement of the head rest. Accordingly, a particular head rest height is associated with each seat position. A principal disadvantage with this technique for setting the head rest height is the reliance on the erroneous assumption that a driver/passenger always correctly positions the seat. Also, no allowance is made for the fact that some people have unusually long or short torsos and/or legs which of course effects the relationship of head rest height to its fore-aft seat positioning.

German Patent Document DE 30 21 126 (corresponding to U.S. Pat. No. 4,645,233) teaches to provide a first electric motor to a seat back to control the height adjustment for a head rest and a second electric motor to an upper seat belt deflection mounting assembly to adjust the height of the shoulder belt with respect the seat back. An infrared sensor assembly is also provided and is used to assist the seated passenger to control the height adjustment for both electric motors.

The above described prior art devices for automatically adjusting head rest height in combination with seat belt restraint systems are expensive to manufacture and implement in automobiles and, therefore, have not become common in practice.

Accordingly, there is a need in the art for an inexpensive safety seat belt restraint mechanism for motor vehicle seats which automatically adjusts the height of the head rest to a proper position in response to an accident and which can be realized with particularly simple structurally means. There is also a need in the art for an inexpensive height adjustable head rest and safety restraint configuration for auto motor vehicle seats whereby after an initial set-up adjustment for the passenger/driver is made, no further height adjustments are required.

THE INVENTION

Objects

It is a principle object of the present invention to provide a seat having an adjustable head rest assembly which is automatically adjusted to an optimal height for reducing the risk of head or neck injury to a seated passenger in the event of a frontal collision;

It is another object of the present invention to provide such a height adjustable head rest assembly, which is structurally very simple and inexpensive to implement; and Still other and further objects will be evident from the following drawings, description and claims.

DRAWINGS

The invention is described in greater detail by reference to the drawings in which:

FIG. 1 is a partial schematic in side elevation of the safety arrangement of the present invention showing a seat, a height adjustable head rest arranged thereon and a seat belt guided through an upper deflection mounting and around the chest of a passenger;

FIG. 2 is a frontal view of FIG. 1 but with the passenger removed;

FIG. 3 is a side elevation schematic view illustrating the operation of the safety arrangement as the seat belt is stressed during a frontal collision with the passenger in a jack-knifed position;

FIG. 4 is a isometric view of an alternate embodiment of the invention illustrating a height adjustable head rest deflection mounting; and FIG. 5 is a schematic representation of an alternate embodiment of the invention illustrating an electrical circuit for automatically adjusting the head rest height.

SUMMARY

The present invention provides a simple arrangement for automatically adjusting the height of the head rest to an optimal position in the event of an accident. The height adjustment device comprises only a follower or traveller member for the safety belt, formed on the head rest. The head rest is moved into the optimal height position via the follower member when the safety belt is under load (i.e., during a collision). In this case, the head rest is moved upward until the belt forms a straight line extending from the upper deflection point (associated with the motor vehicle interior side wall) through the follower member of the head rest to the shoulder of the wearer. In its broadest terms the follower member provides a pressure surface (or stopping face) for receiving the force of a belt against it to cause the head rest to adjust vertically. The follower is a head-rest moving element which is responsive to the position of the shoulder belt. The follower couples the belt to the head rest.

The precise location of the follower on the head rest depends on the particular arrangement of the individual components, especially the position of the upper deflection point. It is a simple matter to establish the position of the follower, given the structural dimensions and a knowledge of the optimal height position of the head rest. The proposed safety arrangement thus ensures, with simple means, that in event of frontal impact the head of the belted passenger makes contact with a head rest adjusted to optimal height when it is flung backward in the second or recoil phase of movement.

In a principal embodiment, the follower member is formed as part of the head rest itself, by an outward projection or angle, the latter preventing the belt from sliding off the follower surface. However, it is especially advantageous if the pressure face is an eye-type follower member on the head rest. The eye forms a surrounding guide member through which the belt is directed to ensure that the belt is effectively coupled with the head rest at all times. Hence, this reliably precludes a sliding off or unintentional pushing of the safety belt away from the follower.

According to an advantageous embodiment of the invention, the follower member (eye) can be designed height-adjustable. The adjustment allows an individual adaptation to the size of the user of the seat. However, it is especially advantageous if the proposed safety arrangement is combined with a known height-adjustable upper deflection (linkage) point for the safety belt. This ensures that (depending on the selected height adjustment of the deflection mounting) the head rest is also moved into the corresponding height position upon impact. This permits a very simple implementation of the invention without the need for a separate adjustment for the follower member (eye).

If an automatically adjustable upper deflection mounting is present in the motor vehicle, the seat belt will move through it to automatically raise the head rest into the optimal height position upon impact, without requiring a major structural expenditure for a mechanism or an electric drive.

In an alternative construction, one or more inner faces of the eye can be provided with pressure switches or pressure transducers to close a circuit which provides motorized vertical adjustment of the head rest height.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

FIG. 1 shows an upper portion of a motor vehicle seat 5 having a passenger seated thereon. The seat 5 includes a head rest 7, which is height adjustable in the direction as indicated by the upwardly pointing directional arrow. For purposes of this invention, the head rest may be adjusted in a conventional way by any number of known means for providing vertical height adjustment to the head rest, including but not limited to, manual height adjustment, electric motor assist, hydraulic system assist, etc. In a principle embodiment of the invention, it is preferred that the head rest 7 be manually height adjustable, since a manual height-adjustable head rest in combination with the minimal amount of additional structural components results in an inexpensive and simple arrangement for providing automatic head adjustment during a collision.

Also provided to the seat 5 is a safety belt 9, which is guided from a known type of automatic winder (not shown) to an upper deflection mounting 11. The upper deflection mounting 11 preferably has a pivot attachment which permits the belt to swing through an arcuate range of vector lines in response to a tightening or slackening of the belt 9. The remaining portion of the belt is arranged in a conventional manner. That is, after the belt 9 passes through the pivoting deflection mounting 11, it is guided obliquely downward past the head rest 7 to the front side of the seat 5 and from there, diagonally across the upper body of the passenger, whereupon the terminal end of the belt is connected to a buckle assembly at the opposite and inwardly disposed hip portion of the seat 5. It is understood that the present invention is applicable to both driver side and passenger side safety belt restraint arrangements, and front or back seat shoulder belts.

As is best seen in FIG. 2, the head rest 7 has attached thereto at a lower corner, an eye-type follower member 13, which is firmly joined to the frame of the head rest 7. The safety belt 9 is directed through the eye. The eye 13 has a "stopping" or pressure receiving face 15, which the belt acts upon to move the head rest 7 in the upward or downward position when the belt 9 is drawn tight.

The operation of the present invention is best described with reference to FIG. 3, wherein a situation of a front end collision event is shown. In this situation, the restrained passenger is flung forward with great momentum, whereupon the safety belt 9, originally located near the top 6 of the seat 5 in its rest position, is stretched in an upward direction. Since the belt 9 is guided through the eye 13 on the head rest 7, it also pulls the head rest 7 upward through the action of the seat belt 9 acting against the pressure face 15 of the eye 13. The head rest 7 continues to move upward until the safety belt 9 forms a straight line extending from the upper deflection mounting 11 across the face 15 to the shoulder of the seat belt wearer (passenger).

The initial position of the head rest 7 is shown in phantom, while the solid line shows the head rest 7 elevated upon collision. The upward raised position of the head rest 7 forms the optimum protection for the head of the passenger to protect against whiplash when it is flung backward in the second, or recoil, phase of the collision movement.

In a preferred embodiment, the upper deflection mounting 11 is adjustable in height so that its position may be preset to the optimum height for each passenger. This adjustment can be done either manually, or automatically through the use of known electric motor arrangements or conventional mechanical actuators. The selected height adjustment of the deflection mounting 11 determines the amount by which the head rest 7 is moved upward upon impact. As is evident from FIG. 3, if the upper deflection mounting 11 is in a lower position, the head rest 7 will be raised a shorter distance upward by the safety belt 9. This correlation insures that, for a smaller person who will accordingly select a lower position of the deflection mounting 11, a suitably less elevated position of the head rest will be available upon impact.

FIG. 4 shows an alternate embodiment of the invention whereby the eye member 13' of the head rest 7 may be independently height adjustable with respect to the head rest 7. The head rest 7 is provided with a slot 21 in which a portion of the eye member 13' is received. The eye member 13' is also provided with a bore hole 19 adapted for receiving a threaded bolt 17 which may be tightened or loosened by hand to permit adjustment of the eye member 13' within the slot 21. A stop face (not shown) and a coordinate rear head rest slot (not shown) are also provided to the front and back portions of the head rest 7 to complete the bore hole/threaded nut adjustment assembly. Alternately, independent eye member height adjustment may be achieved through the use of other known simple mechanical adjustment mechanisms for this purpose, such as spring biased detents, or through the use of known electric motors and geared travel assemblies, such as those used for power seats (forward/backward travel).

FIG. 5 illustrates a second alternate embodiment wherein head rest height is adjusted through the use of an electric motor and gear travel assembly. In this figure, pressure sensitive switches 23 and 29, such as diaphragm switches, are shown schematically arranged along the top and bottom inside seatbelt-contacting surfaces of the eye-type follower member 13. Top switch 23 is connected to a control unit 35 by appropriate wires 25 and 27 and bottom switch 29 is connected to control unit 35 by appropriate wires 31 and 33.

The control unit 35 processes the signed information received from the switches 23 and 29 to activate a reversible motor 41 by wires 42 and 43. The reversible motor 41 is adapted to raise and lower the head rest 7 by any appropriate mechanical linkage to a head rest support member 49 such as, for example, the rack 47 and pinion gear 45 arrangement shown. The control unit 35 is also connected to an appropriate power source of the vehicle electrical system by wires 51 and 53. The power source may be a 12 volt source associated with a provided vehicle battery or a 5 volt (or even 3 volt) source if the implementation of logic devices is desired.

In operation, the seat belt (not shown), when under tension, will exert pressure on the top switch 23 (when the head rest height is too low) or on the bottom switch 29 (when the head rest height is too high) thus causing the affected switch to close and complete the circuit to control unit 35. This signals the motor 41 to raise or lower the head rest 7 by engagement of pinion gear 45 in the tooth rack assembly 47 provided to one of the head rest supports 49 in the manner as shown. While only a simple pressure switch arrangement for operating a motor is described herein, the invention should not be construed to be limited to the use of such contact-type switching arrangements.

As an added safety feature of this invention, the follower, being a means for coupling the belt to the head rest, prevents the user from disabling the shoulder belt by stretching it over the back of the seat instead of the proper position across the chest of the user.

It should be understood that various modifications within the scope of this invention can be made by one of ordinary skill in the art without departing from the spirit thereof. We therefore wish our invention to be defined by the scope of the appended claims in view of the specification as broadly as the prior art will permit.

I claim:

1. In a safety restraint for motor vehicles of the kind wherein a seat belt is provided to a seat having a height adjustable freely vertically movable head rest for restraining the lap and chest portions of a passenger seated thereon and wherein the seat belt is directed from an upper deflection point mounted along an inner surface of the vehicle compartment above and behind said seat to pass obliquely downward over an upper corner portion of the seat back and over the shoulder portion of a passenger to connect with a buckle assembly disposed at the opposite hip portion of said seat, the improvement comprising in operative combination:
   a) means for preselectively adjusting the vertical location of said upper deflection point of said seat belt to compensate for different passenger head heights;
   b) means for coupling said safety belt to said head rest;
      i) said coupling means includes at least one face having a contact surface engaging said seat belt to provide a force component sufficient to move said head rest upward or downward when said over the shoulder portion of said seat belt is brought into tension in a substantially straight line between said passenger shoulder and said upper deflection point by sudden forward movement of a passenger; and
   c) said head rest moves automatically to a pre-determined optimal anti-whiplash height position in relation to said straight line upon application of said force component by said over the shoulder portion of said seat belt engaging said coupling means contact surface when said seat belt undergoes said sudden tension and engages said coupling means face.

2. An improved torso safety restraint system as in claim 1 wherein:
   a) said coupling means includes an eye member; and
   b) said eye member is disposed adjacent a side surface of said head rest.

3. An improved torso safety restraint system as in claim 2 wherein said eye member is height adjustable with respect to said head rest.

4. An improved upper body safety restraint for adjusting the height of a head rest of a vehicle seat to an optimal whiplash-reducing height comprising in operative combination:
   a) a belt for restraining at least the chest portion of a passenger seated thereon, said belt being directed from an upper deflection point mounted along an inner surface of the vehicle compartment above and behind said seat to pass obliquely downwardly over an upper corner portion of the seat back to connect with a buckle assembly disposed at the opposite hip portion of said seat;
   b) motor means mounted on said seat for adjusting the height of said head rest;
   c) means for coupling said safety belt to said head rest wherein:
      i) said coupling means includes an eye member;
      ii) said eye member is disposed on a side surface of said head rest;
   d) sensor means comprising pressure-sensitive switches disposed along top and bottom seat belt contacting surfaces, respectively, of said eye member for detecting seat belt pressure against said coupling means disposed adjacent a seat belt contact surface of said coupling means and in communication with said motor means; and
   e) said sensor means providing a signal to operate said motor means to move said head rest to an optimal whiplash-reducing height as said seat belt undergoes a tension force.

* * * * *